(12) United States Patent
Boos

(10) Patent No.: US 6,987,951 B2
(45) Date of Patent: Jan. 17, 2006

(54) TRANSCEIVER FOR DUPLEX OPERATION

(75) Inventor: Zdravko Boos, München (DE)

(73) Assignee: Infineon Technologies AG, Munich (DE)

( * ) Notice: Subject to any disclaimer, the term of this patent is extended or adjusted under 35 U.S.C. 154(b) by 754 days.

(21) Appl. No.: 09/836,981

(22) Filed: Apr. 18, 2001

(65) Prior Publication Data

US 2002/0039889 A1 Apr. 4, 2002

(30) Foreign Application Priority Data

Apr. 18, 2000 (EP) .......................................... 00108465

(51) Int. Cl.
*H04B 1/40* (2006.01)

(52) U.S. Cl. ............................... 455/85; 455/86
(58) Field of Classification Search ................... 455/76, 455/78, 79, 80, 81, 82, 552.1, 324, 83, 84, 455/85, 86; 370/281, 282, 295
See application file for complete search history.

(56) References Cited

U.S. PATENT DOCUMENTS

| | | | |
|---|---|---|---|
| 5,619,531 A | * 4/1997 | Taylor et al. | 375/222 |
| 5,734,970 A | * 3/1998 | Saito | 455/76 |
| 5,881,369 A | * 3/1999 | Dean et al. | 455/78 |
| 6,175,746 B1 | * 1/2001 | Nakayama et al. | 455/552.1 |
| 6,370,360 B1 | * 4/2002 | Kunkel | 455/76 |
| 6,628,960 B1 | * 9/2003 | Tolson et al. | 370/319 |

FOREIGN PATENT DOCUMENTS

| | | | |
|---|---|---|---|
| GB | 2 310 342 A | 8/1997 | |
| JP | 08 316 873 A | 11/1996 | |
| JP | 10 032 520 A | 2/1998 | |
| JP | 11 330 096 A | 11/1998 | |
| JP | 2000 013 274 A | 1/2000 | |
| JP | 2000 106 533 A | 4/2000 | |
| WO | WO 00/01079 | 1/2000 | |
| WO | 00/07301 | 2/2000 | |

OTHER PUBLICATIONS

Christopher Dennis Hull et al.: "A Direct–Conversion Receiver for 900 MHz (ISM Band) Spread–Spectrum Digital Cordless Telephone", IEEE Journal of Solid–State Circuits, vol. 31, No. 12, Dec. 1996, pp. 1955–1963, XP000691815.

http://www.at.infowin.org/ACTS/ANALYSIS/CONCERTATION/MOBILITY/girafe.htm, dated May 31, 1999.

* cited by examiner

*Primary Examiner*—Lee Nguyen
(74) *Attorney, Agent, or Firm*—Laurence A. Greenberg; Werner H. Stemer; Gregory L. Mayback

(57) ABSTRACT

A transceiver for use in universal mobile telecommunication systems is specified which exhibits an intermediate frequency in a range from 0 to 0.5 megahertz at the receiver end and an intermediate frequency of 190 megahertz at the transmitting end. The configuration described enables it to be operated with frequency duplex division (FDD), time duplex division and FDD variable duplex frequency. When a network operator is only provided with a narrow bandwidth, the configuration described can be operated in a particularly energy-saving manner due to the fact that only one local oscillator is needed for the first and second mixers. In this case, the transmit intermediate frequency of 190 megahertz can be adjusted by +/−5 or +/−10 megahertz. The configuration described can be highly integrated in a simple manner.

6 Claims, 2 Drawing Sheets

TRANSCEIVER FOR DUPLEX OPERATION

BACKGROUND OF THE INVENTION

Field of the Invention

The invention relates to a transceiver.

The mobile radio system Global System for Mobile Communication (GSM), which is widely used today, will be replaced by a third-generation mobile radio system for technological and economic reasons. This system is known by the name of Universal Mobile Telecommunications System (UMTS), in Europe and as International Mobile Telecommunication System (IMT) 2000, internationally. UMTS or IMT 2000, respectively, is intended to provide for a much higher data transmission capacity than GSM and to create an international standard.

A system that is capable of transmitting and receiving simultaneously is called a full duplex system. Systems are also capable of full duplex if transmitting and receiving do not take place simultaneously but the switchover between the two phases is unnoticed by the subscriber. A distinction is made between two fundamental duplex methods: frequency division duplex (FDD) in which transmitting and receiving take place in different frequency bands which are correspondingly separated and time division duplex (TDD) in which the two directions of transmission are separated in different time slots.

In general, transmitting from a mobile station to a base station or fixed station is called an uplink and a transmission from the base station or fixed station to the mobile station is called a downlink.

In TDD, transmitting and receiving frequencies are the same. In UMTS a duplex frequency of 190 megahertz is provided for FDD with a fixed duplex frequency.

Apart from the TDD and FDD transmissions described, an additional FDD with a variable duplex frequency, which can be between 134.8 and 245.2 megahertz, is provided in the UMTS. The duplex frequency is here the frequency spacing between the transmitting and receiving frequency.

The UMTS specification provides two frequency bands from 1900 to 1920 megahertz and from 2010 to 2025 megahertz for TDD transmission. FDD transmission with a fixed duplex spacing of 190 megahertz is provided in a transmitting band from 1920 to 1980 and a receiving band from 2110 to 2170 megahertz.

Compared with the fixed correlation between two channels, namely one uplink and one downlink channel in each case, which is usual with TDD and FDD with fixed duplex frequency, an asymmetric data transmission in which, for example, two downlink channels can be combined with one uplink channel is possible with variable-frequency FDD.

In known IMT 2000 transceivers, a transmitting intermediate frequency of 380 megahertz and a receiving intermediate frequency of 190 megahertz is normally used. In UMTS, however, the 380 megahertz intermediate frequency must be up-converted to approximately 2 gigahertz as a result of which the local oscillator frequency needed falls into the known Industrial Scientific and Medical (ISM) band, which is approximately 2.4 gigahertz. However, this band is used for forming wireless peripheral interfaces in the so-called Bluetooth standard. Since Bluetooth interfaces should be capable of being integrated into mobile telephones which have transceivers, interference is to be expected if a 380 MHz intermediate frequency is used.

In the Gigahertz-Radio-Frontend project GIRAFE, a receiver having an intermediate frequency of 0 megahertz is proposed for a UMTS system. Please refer to the following Internet page http://www.@.infowin.org/acts/analysys/concertation/mobility/girafe.htm.

SUMMARY OF THE INVENTION

It is accordingly an object of the invention to provide a transceiver that overcomes the above-mentioned disadvantages of the prior art devices of this general type, which is suitable for the duplex methods FDD, TDD and FDD with variable frequency spacing and which has a low power requirement and is also suitable for large-scale integration.

With the foregoing and other objects in view there is provided, in accordance with the invention, a transceiver containing a transmitting branch, a receiving branch, and a duplex unit connected to the transmitting branch, to the receiving branch and to be connected to an antenna. The duplex unit separates the transmitting branch from the receiving branch. A first mixer is provided and has an output and an input connected to the receiving branch. A first local oscillator is connected to the first mixer. A receiving intermediate-frequency path is connected to the output of the first mixer. The receiving intermediate-frequency path has an intermediate-frequency in a range of 0 to 0.5 megahertz. A second mixer is provided and has an input and an output connected to the transmitting branch. A transmitting intermediate-frequency path is connected to the input of the second mixer. The transmitting intermediate-frequency path has an intermediate-frequency in a range of 180 megahertz to 200 megahertz. A second local oscillator is connected to the second mixer.

Compared with existing IMT 2000 transceiver concepts with a receiver intermediate frequency of 190 megahertz which is very close to normal television frequencies, the configuration described, with a receiving intermediate frequency in a range from 0 to 0.5 megahertz, has the advantage that the possibility of injecting television transmission frequencies is reduced. This is of special significance in the case of UMTS receivers which have a very high receiving sensitivity. Since an intermediate frequency in a range from 0 to 0.5 megahertz is provided in the receiver, the power consumption is low. A receiver which has an intermediate frequency in a range from 0 to 0.5 megahertz does not need an image frequency filter. This simplifies the structure of the transceiver. Having the receiving intermediate frequency in a range from 0 to 0.5 megahertz provides for a maximum of flexibility with respect to the integration of other mobile radio systems. If a code division multiple access (CDMA) subscriber separation is used in which AC coupling is allowed, the DC offset problems which usually afflict 0-megahertz intermediate-frequency receivers are largely suppressed. Furthermore, the integration of the first local oscillator in the transceiver reduces problems with respect to auto-mixing in the local oscillator. Overall, the configuration described provides for a maximum of integration capability.

Compared with the 380 megahertz known for IMT 2000, the transmitting intermediate frequency of 190 megahertz +/−5 megahertz or +/−10 megahertz leads to a much lower power consumption. Since, in mobile radio, transceivers are normally used in mobile telephones that should be particularly small and of light weight, this feature is especially advantageous. If, in the case of FDD with variable frequency spacing, the deviation of the frequency spacing from 190 megahertz is less than or equal to +/−10 megahertz, a common first local oscillator can perform both the conversion of the receiving frequency into the receiver intermediate frequency and the conversion of the transmitter intermediate frequency into the transmitting frequency. This further reduces power consumption and space requirement of the transceiver and interference signals.

Since, in practical mobile radios, there are a number of network operators among which the existing bandwidth of the network or, respectively, of the transmission channels must be divided, it is conceivable that an individual network operator only receives 15 megahertz bandwidths in the UMTS system. In the case of FDD with variable duplex spacing, the duplex frequency is therefore limited to 190 megahertz +/−5 megahertz or +/−10 megahertz, respectively. It is therefore advantageous to vary the transmitting intermediate frequency in such a manner that it is either 180 or 185 or 190 or 195 or 200 megahertz. In this case, only one local oscillator or, respectively, voltage-controlled oscillator is capable of providing the requirements of the frequency duplex method with variable duplex frequency for a network operator which only has a limited bandwidth available. This makes it possible to have an FDD operation with variable duplex frequency with low power consumption and a low number of interference signals.

In an advantageous embodiment of the present invention, a first changeover switch is provided by which it is possible to connect the first local oscillator or a further local oscillator to the second mixer. For an FDD operation with variable duplex frequency which only slightly deviates from the fixed duplex frequency, the power-saving operation with a single first local oscillator which is connected to the first mixer and to the second mixer is sufficient. If, however, it is intended to exploit the full spectrum of the FDD with variable frequency spacing from 134.8 to 245.2 megahertz, the second mixer can be switched to the further local oscillator. To prevent unwanted signals that are caused by the operation of two local oscillators which have closely adjacent frequencies of oscillation and by nonlinearities in the transceiver, the further local oscillator should have a frequency of oscillation which is below the transmitting frequency of the transceiver. As a result, the further local oscillator will not interfere with the first local oscillator as a result of which both local oscillators can be integrated in a common IC.

In a further advantageous embodiment of the present invention, a baseband unit, to which the transmitting and receiving intermediate-frequency paths are connected, has a digital mixer which can be detuned in steps of 200 kilohertz. The digital mixer performs a frequency correction of +/−200 or, respectively, +/−400 kilohertz as deviation from the fixed duplex frequency of 190 megahertz. This two-step tuning solution has the advantage that the radio-frequency phase-locked loops can operate with steps of 1 megahertz in the first and further local oscillator. This reduces the multiplication of the phase noise in the phase-locked loops so that the requirements for phase detectors or charge pumps can be relaxed and the power consumption can thus be reduced. For example, the multiplication of the phase noise is reduced by a factor of 20* log (5) in the case of 1 megahertz steps in the phase detector. As a result, it will also be possible for the switchover of the phase-locked loop to be faster. The time for a frequency search in the UMTS system is reduced by a factor of 4 due to the fact that the switching times in the digital mixer are distinctly shorter in comparison with a phase-locked loop. The capacitances in the phase-locked loop can be smaller which results in additional advantages in the integration. Should 100 kilohertz frequency steps be needed in future due to changes in the UMTS specification, these can be implemented more easily in the digital mixer than in phase-locked loops.

In accordance with an added feature of the invention, a third mixer is connected to the second mixer, a digital-to-analog converter is connected to the third mixer, and a third local oscillator is connected to the third mixer.

In accordance with an additional feature of the invention, the first local oscillator, the second local oscillator and the third local oscillator in each case have a voltage-controlled oscillator and a phase-locked loop.

In accordance with a further feature of the invention, the transceiver is a universal mobile telecommunications system transceiver, and the duplex unit has a frequency splitter and a switch connected to the frequency splitter.

Other features which are considered as characteristic for the invention are set forth in the appended claims.

Although the invention is illustrated and described herein as embodied in a transceiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
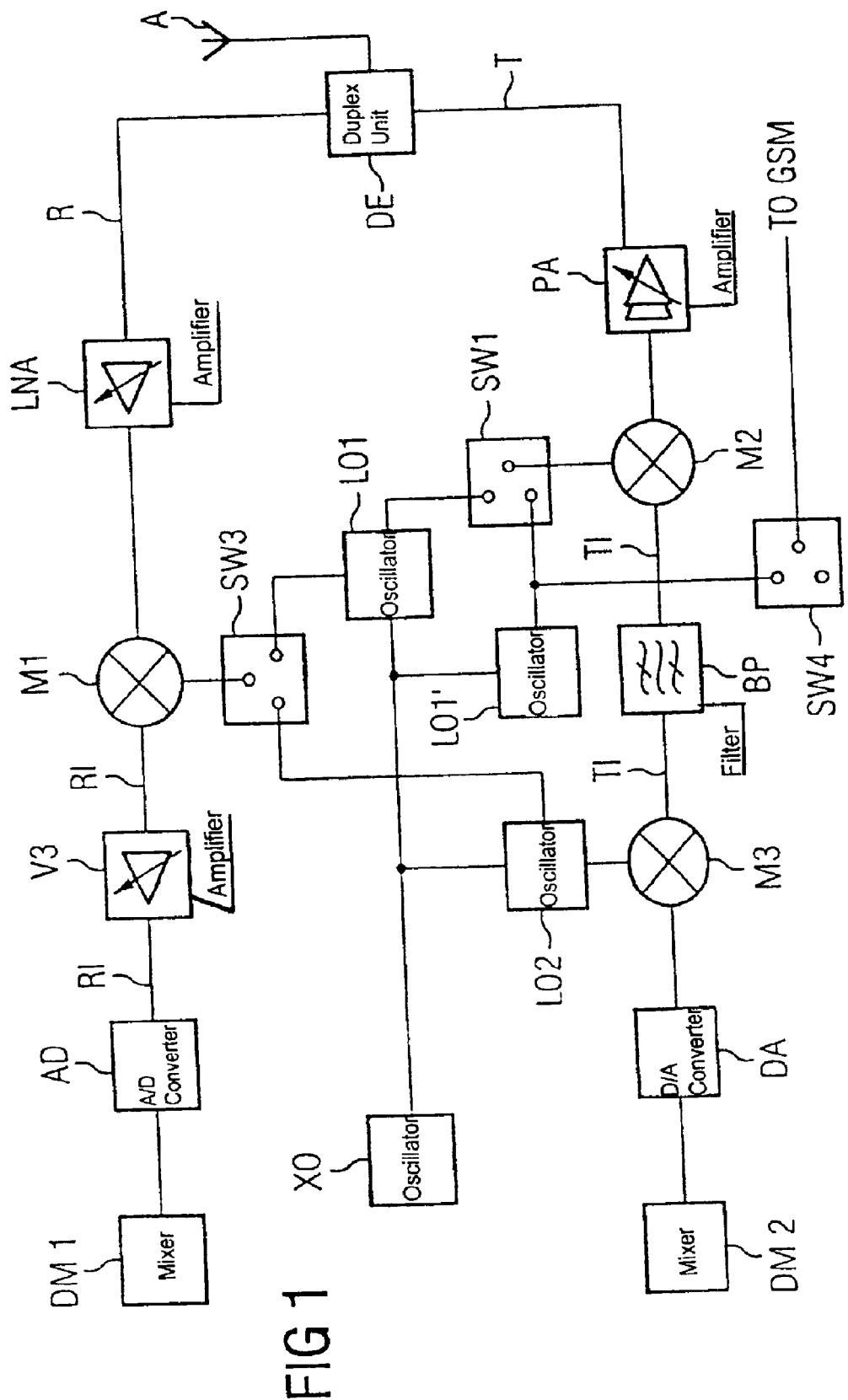
FIG. 1 is a simplified block diagram of a transceiver according to the invention.

In all the figures of the drawing, sub-features and integral parts that correspond to one another bear the same reference symbol in each case. Referring now to the figures of the drawing in detail and first, particularly, to FIG. 1 thereof, there is shown a transceiver containing a duplex unit DE, which is connected to a transmitting and receiving antenna A. The duplex unit separates a transmitting branch T from a receiving branch R at this radio-frequency level. The receiving branch R exhibits a low-noise preamplifier LNA which is constructed to be controllable. The receiving branch R is connected to a first mixer M1 that is connected to a first local oscillator LO1 through a third switch SW3. In the first mixer M1, a received signal is down-converted to an intermediate-frequency level with a local-oscillator signal. The first mixer M1 is connected to a receiving intermediate-frequency path RI that has an amplifier V3 which is constructed to be controllable. The receiving intermediate-frequency path is followed by an analog/digital converter AD and a first digital mixer DM1. This is used for detuning the frequency in the receiving intermediate-frequency path RI in steps of 200 kilohertz. Other modules usually provided in a transceiver such as, for example, voice decoding are not drawn in FIG. 1. The transmitting branch T exhibits a transmitting amplifier PA that is controllable and is connected to a second mixer M2. A transmitting intermediate-frequency path TI connected to the second mixer M2 can exhibit an intermediate-frequency signal that is mixed with a local oscillator signal to form the desired transmitting frequency. The transmitting intermediate-frequency path TI exhibits a band-pass filter BP that has a mean frequency of 190 megahertz at an intermediate frequency of 190 megahertz in the transmitter. The pass band of the band-pass filter BP extends from 180 to 200 megahertz. A second local oscillator LO2 is connected to a third mixer M3 that is connected to the transmitting intermediate-frequency path TI. Furthermore, the third mixer M3 is connected to a digital/analog converter chip DA, which is connected to a second digital mixer DM2 for detuning the transmitting baseband frequency in 200 kilohertz steps. The third mixer M3 is used for up-converting a baseband signal to an intermediate-frequency level by use of a second frequency of oscillation.

The first and the second digital mixer DM1, DM2 are also used for automatic frequency control (AFC) in the baseband. For this purpose, any frequency from 0.1 hertz up to half the clock frequency of the mixers can be set by the digital mixers. In the UMTS specification, a frequency pattern with steps of 200 kilohertz is described for transmitting and receiving. Together with synthesizers disposed in the local oscillators LO1, LO1', LO2 and having a step length of 1 megahertz, any UMTS frequency can be advantageously set in a 200-kilohertz pattern by detuning the digital mixers by +/−200 kilohertz or by +/−400 kilohertz.

For FDD operations with a variable duplex frequency which has a large deviation from the fixed duplex frequency of 190 megahertz, a first changeover switch SW1 can be provided for switching the connection of the second mixer M2 to the first local oscillator to another local oscillator LO1'. Using the third switch SW3, the first mixer M1 can be switched from the first local oscillator LO1' to the second local oscillator LO2. This is advantageous, in particular, for TDD reception since the frequencies of the first and of the further local oscillator LO1, LO1' differ distinctly from the required TDD receiving intermediate frequency in this case whereas the latter overlaps the frequency range of the second local oscillator when this corresponds to seven times the transmitting intermediate frequency and the doubled TDD receiving frequency can be generated by multiplying the frequency of the second local oscillator LO2 by a factor of three. Since FDD or, respectively, TDD transmitting and TDD receiving do not take place simultaneously, the second local oscillator can support both operating modes. The first local oscillator LO1, the second local oscillator LO2 and the further local oscillator LO1' are connected to a common reference oscillator XO. The configuration described has the advantage that the local oscillators have only a small tuning range. As a result, they are improved with respect to phase noise, sensitivity, substrate noise and response.

Since, initially, full network coverage will not be guaranteed on introduction of the UMTS system and since, at the same time, the existing GSM networks offer almost all coverage, it is advantageous that UMTS transceivers are capable of monitoring the availability and the quality of the GSM channels in the case of poor UMTS reception. A special operating method, the so-called slotted mode, is provided for this purpose. This exhibits time gaps in the transmission during which the GSM channels can be monitored. To keep the transmission rate constant, the data must be compressed preceding the gaps. The so-called compressed mode is provided for this purpose. However, this reduces the network capacity. The slotted mode is provided for monitoring GSM 1800 channels whereas GSM 900 channels, that is to say GSM reception, can be simultaneously monitored with UMTS transmission. The first and the second local oscillators LO1, LO2 are used for this UMTS transmission while at the same time the further local oscillator LO1' is used for GSM reception. For this purpose, a fourth switch SW4 is provided which can switch the further local oscillator LO1' through to a GSM transceiver.

For better clarity, a table containing the frequency ranges of the local oscillators in megahertz (third and fourth row) and the respective transmitting and receiving modes (first column) is specified. An X here indicates an active local oscillator. Tx stands for transmit and Rx for receive.

| Local oscillator | | LO1 | LO2 | | LO1' | |
|---|---|---|---|---|---|---|
| Operating mode | | | | TDD Rx | GSM 900 Rx | GSM 1800 Rx |
| Frequency range in MHz | | 4184 to 4426 | 1330 +/−70 | 3800 to 4050 | 3464 to 3840 | 3700 to 3840 | 3610 to 3760 |
| FDD Fixed duplex | Tx | X | X | | | |
| FDD Fixed duplex | Rx | X | | | | |
| FDD Var. duplex +/−5, +/−10 MHz | Tx | X | X | | | |
| FDD Var. duplex +/−5, +/−10 MHz | Rx | X | | | | |
| FDD Var. duplex 134.8–245.2 MHz | Tx | | X | | X | |
| FDD Var. duplex 134.8–245.2 MHz | Rx | X | | | | |
| TDD | Tx | X | X | | | |
| TDD | Rx | | | X | | |
| FDD standby | Rx | X | | | | |
| TDD standby | Rx | | | X | | |
| UMTS FDD transmit | Tx | X | X | | | |
| GSM receive | Rx | | | | | X |
| UMTS TDD transmit | Tx | X | X | | | |
| GSM receive | Rx | | | | | X |

The frequency range of the second local oscillator LO2 in FDD mode from 1260 to 1400 megahertz corresponds to seven times the transmitting intermediate frequency which is in a range from 180 megahertz to 200 megahertz. The frequency range of the second local oscillator LO2 for the TDD operating mode is in the range of the third harmonic of the frequency range of the second local oscillator LO2 in FDD mode. For GSM 900, that is to say a GSM system in the 900 megahertz band, a local oscillator frequency of from 3700 to 3840 megahertz is required with a receiving band from 925 to 960 megahertz and four times the frequency. For GSM 1800, that is to say a GSM system in the 1800 megahertz band, a local oscillator frequency of from 3610 to 3760 megahertz is required with a receiving band from 1805 to 1880 megahertz and twice the frequency.

The exemplary embodiment according to FIG. 1 has the advantage that operation is possible both with time division duplex, frequency division duplex with fixed duplex frequency and frequency division duplex with variable duplex frequency. The simple structure and the high integration capability are the result of the receiving intermediate frequency in a range from 0 to 0.5 megahertz and the transmitting intermediate frequency of 190 megahertz. The lower transmitting and receiving intermediate frequencies compared with known IMT 2000 transceivers and the possible operation using only one first local oscillator LO1 ensure low power consumption.

Figure 2:
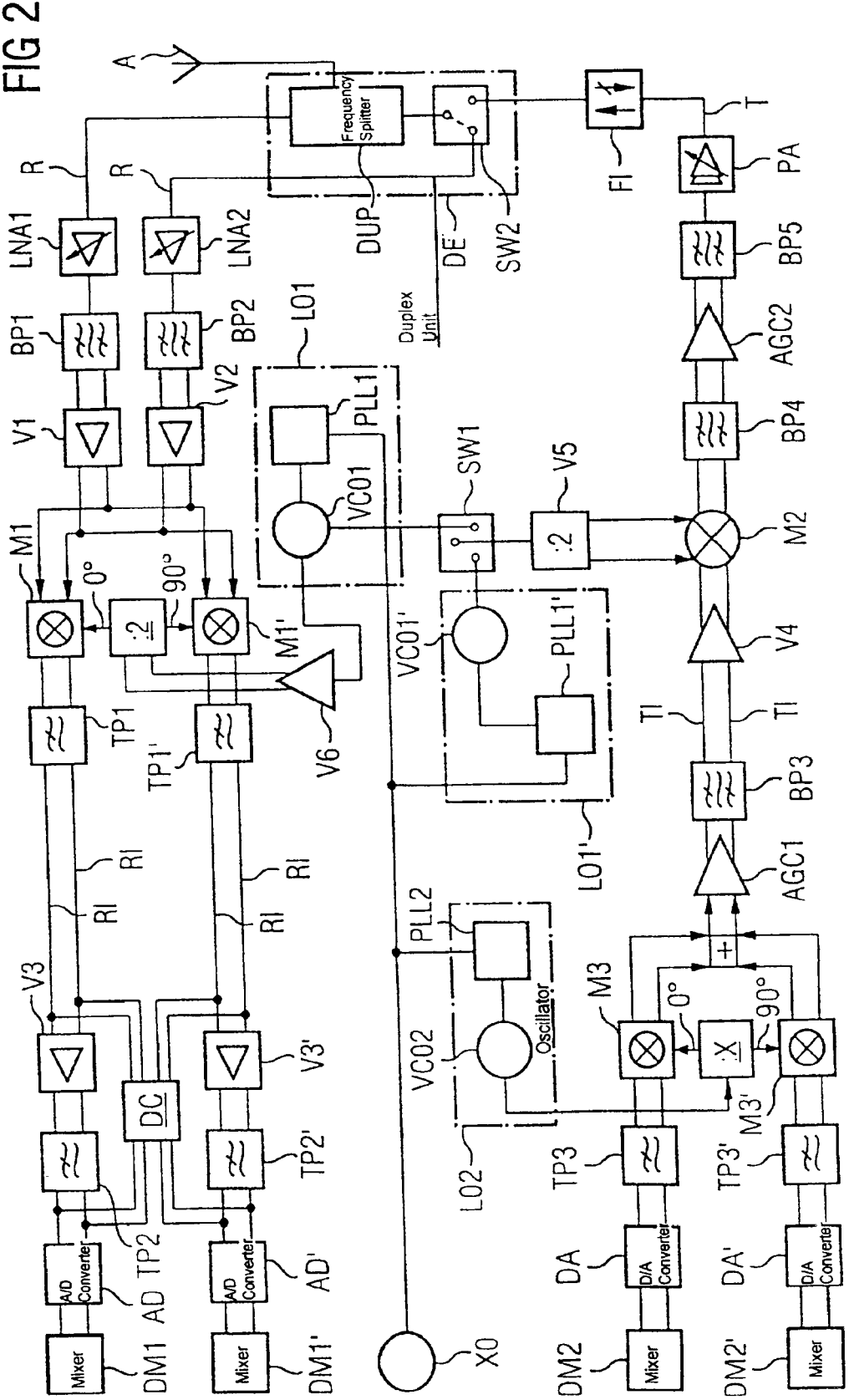
FIG. 2 is a block diagram of a second embodiment of the transceiver according to the invention.

FIG. 2 shows a second exemplary embodiment containing the duplex unit DE which has a frequency splitter DUP and a switch SW2. The frequency splitter DUP separates the FDD downlink band that is supplied to a first low-noise preamplifier LNA1 from FDD uplink and TDD bands by a suitable choice of transmitting and receiving filters. Transmission and reception in TDD mode are separated in the second switch SW2. The second low-noise preamplifier LNA2 is used for amplifying in TDD receiving mode. The band-pass filters BP1, BP2 following the low-noise preamplifiers LNA1, LNA2 are adapted to the respective receiving frequency bands and to the amplifiers V1, V2 following them. To convert the receiving frequencies into an intermediate frequency of 0 megahertz, two first mixers M1, M1' are provided, which are in each case followed by a low-pass filter TP1, TP1'. The first mixers M1, M1' are supplied with a halved first local oscillator frequency LO1 which is generated in a first local oscillator LO1 and amplified in an amplifier V6. The intermediate-frequency signals are supplied to an A/D converter AD, AD' from additional amplifiers V3, V3' followed by low-pass filters TP2, TP2' in which a DC offset compensation is performed by a compensator DC. AC coupling is possible as an alternative to this DC offset compensation. At the transmitting end T, a directional filter FI preceded by a controllable power amplifier PA and a band-pass filter BP5 is connected to the duplex unit DE. These are preceded by a gain-controlled amplifier AGC2.

A second mixer M2 which up-converts the transmitting intermediate frequency to the respective desired transmitting frequency by using a local oscillator frequency is connected via a further band-pass filter BP4. The first switch SW1 can switch the frequency of oscillation to be supplied to the second mixer M2 via a divider V5 which divides by two, between the first local oscillator LO1 and the further local oscillator LO1'. The second mixer M2 is preceded by third mixers M3, M3' which up-convert signals conditioned in digital/analog converters DA, DA' and low-pass filters TP3, TP3' to the transmitting intermediate frequency by the second local oscillator LO2. An amplifier V4, a band-pass filter BP3 and a gain-controlled amplifier AGC1 are provided between the second and third mixer M2, M3 in the transmitting intermediate-frequency path TI. The local oscillators LO1, LO1', LO2 in each case have a phase-locked loop PLL1, PLL1', PLL2 and a voltage-controlled oscillator VCO1, VCO1', VCO2.

The circuit configuration of the transceiver according to FIG. 2 provides for operation with frequency division duplex with a fixed duplex frequency, frequency division duplex with a variable duplex frequency and time division duplex. If a narrow bandwidth of, for example, 15 megahertz is available to a network operator in the UMTS system, an energy-saving FDD mode with variable duplex frequency using only one first local oscillator LO1 which is connected to first and second mixers M1, M2 can be effected with the present transceiver. The circuit configuration described provides for a high-density integration.

I claim:

1. A transceiver, comprising:

a transmitting branch;

a receiving branch;

a duplex unit connected to said transmitting branch, to said receiving branch and to be connected to an antenna, said duplex unit separating said transmitting branch from said receiving branch;

a first mixer having an output and an input connected to said receiving branch;

a first local oscillator connected to said first mixer;

a receiving intermediate-frequency path connected to said output of said first mixer, said receiving intermediate-frequency path having an intermediate-frequency in a range of to 0.5 megahertz;

a second mixer having an input and an output connected to said transmitting branch;

a transmitting intermediate-frequency path connected to said input of said second mixer, said transmitting intermediate-frequency path having an intermediate-frequency in a range of 180 megahertz to 200 megahertz;

a second local oscillator;

a changeover switch connected to said first local oscillator, to said second local oscillator and to said second mixer;

a third mixer connected to said second mixer;

a digital-to-analog converter connected to said third mixer; and a third local oscillator connected to said third mixer.

2. The transceiver according to claim 1, wherein the intermediate frequency of said transmitting intermediate-frequency path is selected from the group consisting of 180 megahertz, 185 megahertz, 189.6 megahertz, 1.89.8 megahertz, 190 megahertz, 190.2 megahertz, 190.4 megahertz, 195 megahertz and 200 megahertz.

3. The transceiver according to claim 1, wherein said second mixer is connected to said first local oscillator.

4. The transceiver according to claim 1, wherein said first local oscillator, said second local oscillator and said third local oscillator in each case have a voltage-controlled oscillator and a phase-locked loop.

5. The transceiver according to claim 1, including:

a first baseband unit connected to said receiving intermediate-frequency path and having a digital mixer which can be detuned in steps of 200 kilohertz; and a second baseband unit connected to said transmitting intermediate-frequency path and having a digital mixer which can be detuned in steps of 200 kilohertz.

6. The transceiver according to claim 1, wherein the transceiver is a universal mobile telecommunications system transceiver, and said duplex unit has a frequency splitter and a switch connected to said frequency splitter.

* * * * *